United States Patent
Bäckman et al.

(10) Patent No.: US 10,075,229 B2
(45) Date of Patent: Sep. 11, 2018

(54) METHOD AND TRANSCEIVER FOR NETWORK DIVERSITY IN LONG DISTANCE COMMUNICATIONS

(71) Applicant: SAAB AB, Linköping (SE)

(72) Inventors: Anders Bäckman, Göteborg (SE); Morgan Andersson, Romelanda (SE)

(73) Assignee: SAAB AB, Linköping (SE)

( * ) Notice: Subject to any disclaimer, the term of this patent is extended or adjusted under 35 U.S.C. 154(b) by 159 days.

(21) Appl. No.: 14/898,866

(22) PCT Filed: Jun. 26, 2013

(86) PCT No.: PCT/SE2013/050795
§ 371 (c)(1),
(2) Date: Dec. 16, 2015

(87) PCT Pub. No.: WO2014/209179
PCT Pub. Date: Dec. 31, 2014

(65) Prior Publication Data
US 2016/0191140 A1    Jun. 30, 2016

(51) Int. Cl.
H04B 7/155    (2006.01)
H04B 7/185    (2006.01)
H04B 7/212    (2006.01)

(52) U.S. Cl.
CPC ..... H04B 7/15592 (2013.01); H04B 7/15507 (2013.01); H04B 7/18502 (2013.01); H04B 7/2125 (2013.01); H04B 7/2126 (2013.01)

(58) Field of Classification Search
CPC .............. H04B 7/15592; H04B 7/2126; H04B 7/15507; H04B 7/2125; H04B 7/18502
See application file for complete search history.

(56) References Cited

U.S. PATENT DOCUMENTS

| | | | |
|---|---|---|---|
| 2003/0016770 A1* | 1/2003 | Trans | H04B 1/00 375/346 |
| 2008/0039016 A1* | 2/2008 | Bonta | H04B 7/2606 455/41.2 |
| 2010/0094687 A1* | 4/2010 | Waggaman, III | G06Q 10/06398 705/7.42 |
| 2010/0190433 A1 | 7/2010 | Zhang et al. | |

(Continued)

FOREIGN PATENT DOCUMENTS

| | | |
|---|---|---|
| EP | 1942614 A1 | 7/2008 |
| WO | 2011094021 A1 | 8/2011 |

OTHER PUBLICATIONS

Extended European Search Report dated Feb. 6, 2017 in corresponding PCT Application No. PCT/SE2013/050795.

(Continued)

*Primary Examiner* — Jay P Patel
(74) *Attorney, Agent, or Firm* — Venable LLP; Jeffri A. Kaminski

(57) ABSTRACT

A method in a main node for communication with a destination node over long distances. Use of at least one communications resource is synchronized with an auxiliary node. A main signal and an auxiliary signal are generated from an information quantity. The main signal is transmitted to the destination node by the at least one synchronized communications resource. The auxiliary signal is transmitted to the auxiliary node by the at least one synchronized communications resource.

12 Claims, 8 Drawing Sheets

(56) References Cited

U.S. PATENT DOCUMENTS

| | | | |
|---|---|---|---|
| 2010/0260042 A1 | 10/2010 | Kwon et al. | |
| 2012/0188880 A1* | 7/2012 | Beeler | H04L 41/145 |
| | | | 370/246 |
| 2016/0254853 A1* | 9/2016 | Atkinson | H04L 1/0041 |
| | | | 370/329 |

OTHER PUBLICATIONS

PCT/ISA/210—International Search Report—dated Apr. 1, 2014 (Issued in Application No. PCT/SE2013/050795).
PCT/ISA/237—Written Opinion of the International Searching Authority (Issued in Application No. PCT/SE2013/050795).
S. Loyka et al; "Fading Prediction on Microwave Links for Airborne Communications"; Vehicular Technology Conference, 2001, VTC 2001, IEEE VTS 54th, vol. 4, pp. 960-1964; Abstract; Figure 4; Sections I and III.
A. Macmillan et al; "Slow Frequency Hopping for Mitigating Tidal Fading on Rural Long Distance Over-Water Wireless Links," INFOCOM IEEE Conference on Computer Communications Workshops, 2010, pp. 1,5, 15-19; Mar. 2010; Abstract; Figure 3; Sections I, I.A and III.

\* cited by examiner

METHOD AND TRANSCEIVER FOR NETWORK DIVERSITY IN LONG DISTANCE COMMUNICATIONS

CROSS-REFERENCE TO RELATED APPLICATIONS

The application is the national phase under 35 U.S.C. § 371 of PCT/SE2013/050795 filed 26 Jun. 2013.

TECHNICAL FIELD

The present disclosure relates to methods and transceivers for communication between a main node and a destination node over long distances.

BACKGROUND

Communication involving airborne transceivers is subject to radio propagation which is often well described by a radio propagation channel model with two propagation paths, herein referred to as a two-path channel model. This two-path channel model has one direct path from transmitter to receiver, and one in-direct path from transmitter to receiver, via at least one reflector like a surface plane or similar.

Communication involving airborne transceivers also often take place over long distances. Examples include communication between a surface based unit and an airborne unit beyond the horizon, and also communication between two airborne units where the air-to-air communication link can extend to distances such that the line of sight between communicating nodes touches or almost touches the horizon.

This type of long distance radio link, characterized by the two-path channel model, is subject to challenging multi-path fading conditions which complicate communication between network nodes. To further complicate matters, strict requirements on, e.g., transmission capacity in terms of information bits per second and tight delay communication deadlines must often be met.

The challenges related to the type of long distance communication described above are mainly related to the distance dependency of the multi-path fading as predicted by the two-path channel model. A problem related to said distance dependency is that the fading condition, i.e., the propagation path gain, varies slowly or very slowly as the propagation path distance varies, i.e., the fading process is comparably slow compared to short distance communication links. The effect is especially pronounced at lower frequency bands, and becomes somewhat less pronounced at very high frequencies. This means that a large displacement of communication transceivers is needed in order to achieve a significant difference in communication conditions, e.g., in received signal power. Hence, two communicating nodes may experience poor propagation conditions during extended periods of time, even if the relative velocity and direction of motion of the communicating nodes are such that the propagation link distance changes by several kilometers during a transmission time interval of interest. Note that the propagation path distance is determined by the relative coordinates of the communication nodes and the at least one reflector, including latitude, longitude, and altitude.

These propagation conditions are different compared to the propagation conditions experienced during shorter distance communication, where fading is often much faster, i.e., where there is a much stronger distance dependency, and it is unlikely that two communicating nodes comprising an airborne node will experience poor multi-path conditions during extended periods of time, such as during an entire transmission time interval of interest.

Another propagation phenomenon which can occur during long distance communication is so-called ducting, where the propagation path of a transmitted signal is directed away from a straight line of propagation by different layers in the transmission medium. The propagation path then becomes bent, or curved.

Of course, more than two propagation paths can be included in the channel model to better model certain propagation conditions. Such additional paths may for example arise due to diffraction or ducting phenomena. However, the fundamental problems discussed herein remain essentially the same. Thus only the two-path channel model will be discussed herein.

Previously proposed solutions to combat multi-path fading, ducting, and other related propagation phenomena include equipping each individual node with more than one antenna, or using spread spectrum techniques which utilize a wide bandwidth for communication in the hope that some parts of the utilized spectrum will be free from adverse fading effects.

However, due to the slow fading process mentioned above, i.e., the slow changes in propagation path gain with changing link distance in long distance communication links, previously proposed solutions to combat multi-path fading are often ineffective.

SUMMARY

An object of the present disclosure is to provide a method and a transceiver which seeks to mitigate, alleviate, or eliminate one or more of the above-identified deficiencies in the art and disadvantages singly or in any combination and to provide improved methods and transceivers for communication.

This object is obtained by a method in a main node for communication with a destination node over long distances. The method comprises the steps of synchronizing the use of at least one communications resource with an auxiliary node, and also generating a main signal and an auxiliary signal from an information quantity. The method further comprises the step of transmitting the main signal to the destination node by the at least one synchronized communications resource, and also transmitting the auxiliary signal to the auxiliary node by the at least one synchronized communications resource.

According to an aspect, the at least one communications resource comprises at least one out of a transmission time schedule, a transmission frequency allotment schedule, and a spread spectrum spreading code assignment schedule.

According to an aspect, the method in a main node for communication with a destination node over long distances further comprises the step of transmitting the auxiliary signal to the destination node.

According to aspects, either of the main node, the destination node, and the auxiliary node is an airborne node.

According to an aspect, the auxiliary signal transmitted to the auxiliary node is arranged to be received, processed, and re-transmitted by the auxiliary node towards the destination node. It is noted that the step of processing can constitute simply forwarding between a receive and a transmit part of the auxiliary node.

The synchronizing of the at least one communications resource between a main node and an auxiliary node, and the transmitting of the information quantity via both main and auxiliary transmit signals to the destination node, using forwarding or re-transmission by the auxiliary node of the auxiliary signal, involves a surprising effect on a system level. Previous solutions to mitigate challenging multi-path fading conditions have often failed due to the above-mentioned distance dependency of the multi-path fading. However, by utilizing an auxiliary node which can be located far away from the main node, the distances between transmit antennas of the main node and the auxiliary node can in fact be large enough to provide diversity gains with respect to the destination node despite said slow fading and above-mentioned low variation effects of distance dependency, even at lower frequency bands.

Thus, surprisingly, diversity gains can be established even in communication systems comprising airborne nodes, subject to long distance communication and two-path channel models, by the clever use of main nodes and auxiliary nodes.

Throughout the present disclosure the phrase network diversity is used when referring to beneficial effects in a network stemming from that an information quantity propagates along different paths of a network from a source or main node to a destination node.

Consequently, by transmitting said information quantity via both main and auxiliary transmit signals to the destination node, network diversity is established. The synchronizing of the at least one communications resource between a main node and an auxiliary node improves the efficiency of communication. Hence, by means of said network diversity and synchronization, reliable and efficient long distance communication is facilitated.

Also, due to said synchronization, the communications link will have long range capability, with no significant added processing delay as would be the case should, e.g., a powerful error correction code have been applied to the communications link between main node and destination node. Another benefit of the above technique is an increased capacity of the communications link, stemming from the improved transmission conditions of the link.

According to an aspect, the method further comprises the step of determining a network geometry and a network propagation condition of a network comprising the main node, the destination node, and the auxiliary node in presence of at least one reflector.

According to an aspect, the method also comprises the step of positioning the auxiliary node based on said determined network geometry and propagation conditions to optimize transmission conditions for communication between the main node and the destination node.

According to an aspect, the step of determining further comprises constructing a propagation condition forecast based on changes in the network geometry and a network propagation condition of the network, and the step of positioning also comprises optimizing transmission conditions for communication between the main node and the destination node based on said propagation condition forecast.

A further advantage of the proposed technique is an extended operational range of network nodes.

Another advantage of the proposed technique is an improved capacity of the communications link, as well as an improved availability of communications possibilities between the main node and the destination node.

The object stated above is further obtained by a method in an auxiliary node for communication between a main node and a destination node over long distances. The method comprises the steps of synchronizing the use of at least one communications resource with the main node. The method also comprises receiving an auxiliary signal from the main node by the at least one synchronized communications resource, and transmitting a forwarded auxiliary signal to the destination node by the at least one synchronized communications resource.

The object stated above is also obtained by a method in a destination node for communication between a main node and a destination node over long distances. The method comprises the steps of receiving a forwarded auxiliary signal from an auxiliary node by a communications resource and also receiving a main signal from a main node by a communications resource. The method further comprises the step of detecting an information quantity comprised in the main signal and in the forwarded auxiliary signal.

There is also disclosed a transceiver arranged for long distance communication in a main node. The transceiver comprises a network communicator unit connected to an antenna unit, a signal processor unit, a synchronization unit, and a transmission condition optimizer. The synchronization unit is arranged to synchronize the use by the network communicator of at least one communications resource with an auxiliary node. The signal processor unit is arranged to generate a main signal and an auxiliary signal from an input information quantity arranged to be received on an input interface of the main node. The network communicator unit is arranged to receive the main signal and the auxiliary signal and to transmit said main and auxiliary signals via the antenna unit to a destination node and an auxiliary node, respectively.

There is further disclosed a transceiver arranged to assist in long distance communication in an auxiliary node. The transceiver comprises a network communicator unit connected to an antenna unit, a signal processor, a synchronization unit, and a transmission condition optimizer. The synchronization unit is arranged to synchronize the use, by the network communicator, of at least one communications resource with a main node. The signal processor unit is arranged to receive, by the network communicator unit, an auxiliary signal and to retransmit said auxiliary signal as a forwarded auxiliary signal by the network communicator unit.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1A:
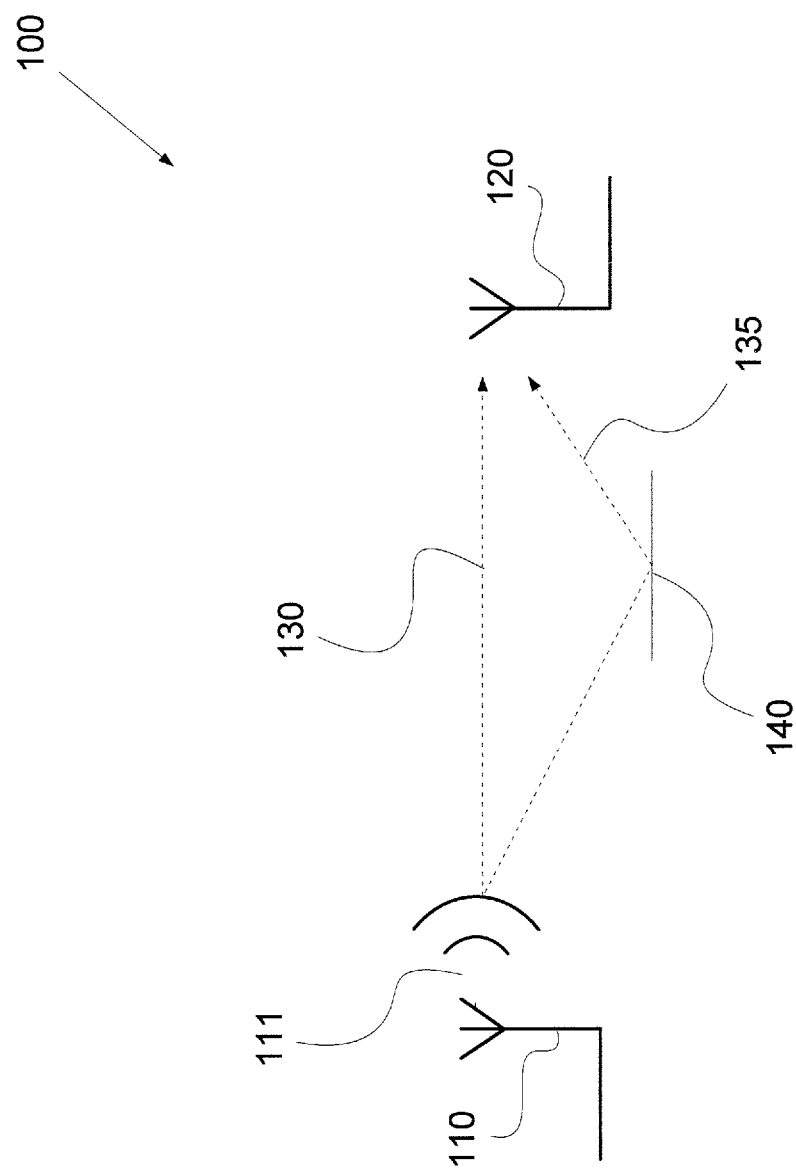
FIG. 1a shows a two-path propagation model according to prior art.

Aspects of the present disclosure will be described more fully hereinafter with reference to the accompanying drawings. The methods and transceivers disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1a shows a two-path channel model 100 according to prior art. A transmitter 110 comprised in a main node transmits a wireless signal 111 comprising an information quantity towards a receiver 120 in a destination node. The wireless signal 111 propagates along at least two principal paths to the receiver 120. A first path 130 is a direct path between transmitter 110 and receiver 120, while a second path 135 is an indirect path 135 via at least one reflector 140. The two paths combine at the receiver 120 to form a received signal which is used by the receiver 120 for detection of the information quantity comprised in the received signal.

The information quantity mentioned above should be construed in a general sense to represent information transmitted from the main node to the destination node.

It is noted that changes in altitude can have a profound effect on propagation conditions as a change in altitude often affects relative propagation path distances significantly. Thus, according to aspects, the relative altitude of the main node compared to the destination node has an influence on the communication distances considered herein as long communication distances.

It is also noted that either of the main node and the destination node can be an airborne node.

Examples of this information quantity includes a data packet with binary encoded information, an information signal such as an analog waveform representing, e.g., a speech signal, or a continuous stream of digitally encoded data.

The combination of the first 130 and second 135 paths at the receiver can be either constructive if the two paths arrive in phase at the receiver 120, or it can be destructive if the two paths arrive out of phase, or anywhere in-between constructive and destructive depending in the relative phase difference of arriving paths. A constructive combination of paths lead to improved transmission conditions, while a destructive combination of paths leads to deteriorated transmission conditions.

Due to the nature of the example two-path channel model shown in FIG. 1a, the attenuation between transmitter and receiver is a function of the relative distance of the first 130 and second 135 propagation paths, i.e., a function of transmitter 110, receiver 120 and the at least one reflector 140 positions in three dimensions in relation to each other, as well as the occupied frequency band of the transmitted wireless signal, and the overall propagation conditions of the communications scenario, which overall propagation conditions comprise, e.g. effects from reflection in a surface plane and also effects from diffraction phenomena.

It is thus understood that the most important parameters determining communication conditions, e.g., received signal strength, according to the two-path model are relative transceiver positions including longitude, latitude, and altitude, and the communication frequency band.

Communication involving an airborne node often abides by the two-path channel, or propagation, model 100 shown in FIG. 1a, since two principal propagation paths are often present. A direct propagation path following a line-of-sight between the airborne node and a destination node, and a reflected path originating from a reflection in, e.g., ground.

Figure 1B:
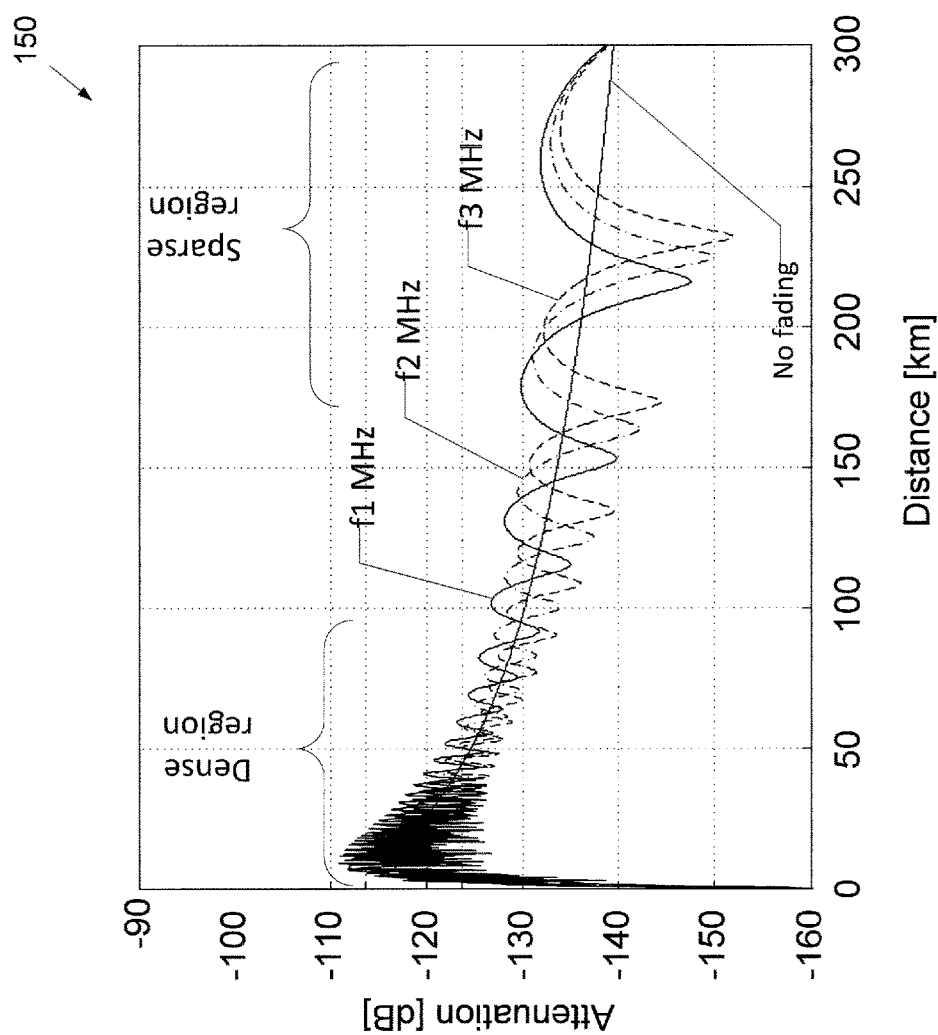
FIG. 1b shows a diagram over signal attenuation.

FIG. 1b shows an example diagram 150 over attenuation (y-axis), measured in dB, of a wireless signal at different carrier frequencies: a lower frequency f1 MHz, a medium frequency f2 MHz, and higher carrier frequency f3 MHz, as the carriers propagate over a varying distance (x-axis), measured in kilometers, in a given two-path model such as the one shown in FIG. 1a.

Note that the three different carrier frequencies shown in FIG. 1b are only to be construed as examples, as the present disclosure is not limited to any specific frequency band or sets of frequency bands.

It is observed in FIG. 1b, that the fading pattern becomes sparse as the link distance increases, meaning that the distance between consecutive attenuation minima increases to become long with increasing link distance such that attenuation minima are located far apart to the right in the signal attenuation diagram 150. I.e., if the link distance is above approximately 100 kilometers in FIG. 1b, the link distance needs to be changed by approximately 20 kilometers in order to impact the attenuation significantly, while, at shorter link distances a more dense fading pattern, meaning that attenuation minima are located much closer together, is observed where much smaller changes in link distance will have a significant impact on attenuation, or, alternatively, smaller changes in frequency will have a significant impact on attenuation.

According to aspects, long distance communication is to be interpreted as communication over distance, measured in meters, where the fading pattern has become sparse according to the above discussion. This means that it is not possible to use multiple antennas attached to a single node in order to improve communication conditions.

It is thus noted that the type of propagation conditions discussed herein may arise also under other network geometries and communication frequencies, for which the disclosure is also applicable. Consequently, whenever propagation conditions are such as to exhibit a sparse region as indicated in FIG. 1b, the present technique is applicable with advantageous results compared to traditional methods of obtaining diversity, e.g., equipping a single node with multiple antennas.

When communicating over long distances, diversity is hard to achieve using a single pair of communicating nodes, since it would not be practical to equip said nodes with such widely separated antennas extending over several kilometers. Also, spread spectrum techniques would need to operate using very wide bands extending, e.g., over hundreds of MHz or more in order not to experience poor propagation conditions over the entire band at times.

Further, even if nodes travel at high radial velocity, poor fading conditions will persist over extended periods of time due to the order of magnitude of involved distances.

Figure 2:
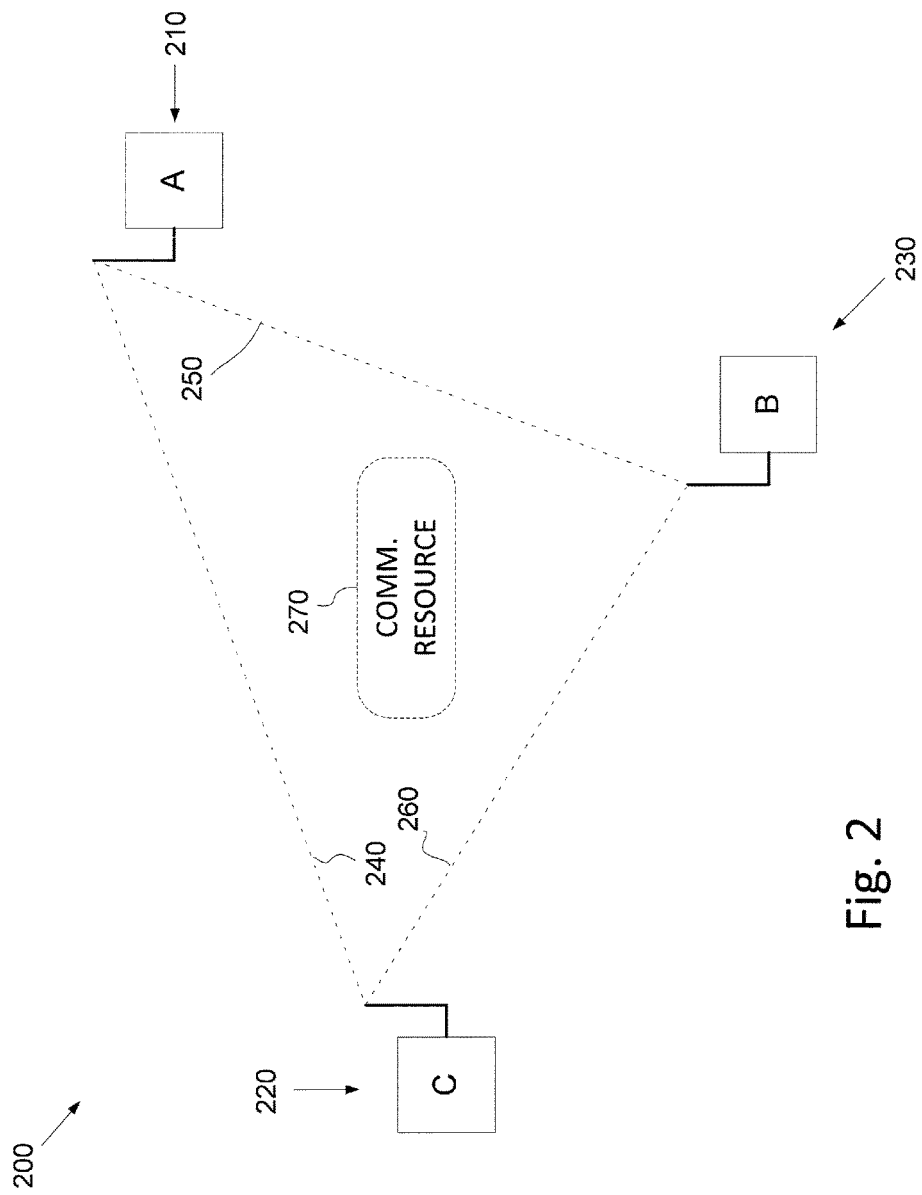
FIG. 2 shows a schematic block diagram of a communications network.

FIG. 2 shows a schematic overview of a communications network 200 comprising three nodes, a main node A 210, a destination node C 220, and an auxiliary node B 230. Communication in the communications network 200 takes place via a communications resource 270, which according to various aspects can be a frequency resource, a time resource, or a spreading code resource, or any combination thereof.

According to various aspects, either of the main node A 210, the destination node C 220, and the auxiliary node B 230 can be an airborne node.

The main node 210 communicates with the destination node 220 by transmitting an information quantity carried by a main signal 240 to the destination node 220 using the communications resource 270. As was discussed in connection to FIG. 1a and FIG. 1b above, this link may experience persistently poor fading conditions due at least in part to said long distance as predicted by the two-path channel model.

However, since the network also comprises the auxiliary node 230, the main node 210 also transmits an auxiliary signal 250 carrying said information quantity to the auxiliary node 230, which then re-transmits the auxiliary signal 250 as a forwarded auxiliary signal 260 to the destination node, by using the same communications resource 270.

The technique shown in FIG. 2 improves on transmission conditions between the main node 210 and the destination node 220 since the auxiliary node 230 can be located a significant distance away from the main node 210, and possibly also at a significantly different altitude, and can therefore be expected to experience different propagation conditions with respect to the destination node 220 than is experienced by the main node 210. Thus diversity is established and transmission conditions improved.

As mentioned above, communication in the communications network 200 uses at least one communications resource 270, shown in FIG. 2 as a dashed block. The communications resource comprises at least one out of a transmission time schedule, a transmission frequency allotment schedule, and a spread spectrum spreading code assignment.

The main node 210 and the auxiliary node 230 are suitably synchronized, such that interference in the system is limited. Various forms of synchronization are preferred depending on method of channel access, e.g.:

Time synchronization to establish time slots wherein transmission occurs by a single transceiver at any given time.

Frequency synchronization to establish frequency sub-bands or sets of frequency sub-bands wherein transmission occurs by a single transceiver at any given time.

Joint frequency and time synchronization to establish sets of frequency sub-bands and time slots wherein transmission occurs by a single transceiver in any given frequency sub-band during any given time slot.

Because of said synchronization, the shared communications resource 270 is more efficiently utilized, which is a key feature of the present technique.

In addition, the transceivers of the network 200 may use traditional diversity methods in order to achieve a further improvement of transmission conditions. Such traditional diversity methods include antenna space diversity, i.e., exploiting multiple antennas carried by a single node, and polarization diversity, i.e., exploiting both horizontally and vertically polarized transmission waveforms.

The main node 210, auxiliary node 230, as well as the destination node 220 may according to embodiments of the network 200 be ground-based nodes such as land-based or sea-based nodes, or airborne nodes.

According to some aspects of the disclosure, either of the main node 210 and the auxiliary node 230 is an airborne node, while the destination node is disposed in connection to a ship or other sea-based vessel, thus forming an air-to-sea communications network.

According to some other aspects of the disclosure, the main node 210 is a sea-based vessel and the auxiliary node 230 is an airborne node, while the destination node is disposed in connection to a ship or other sea-based vessel, thus forming a sea-air-sea communications network.

According to further aspects of the disclosure, the main node 210 is a ground-based node, while the destination node is disposed in connection to a ship or other sea-based vessel, thus forming a ground-to-sea communications network.

Figure 3:
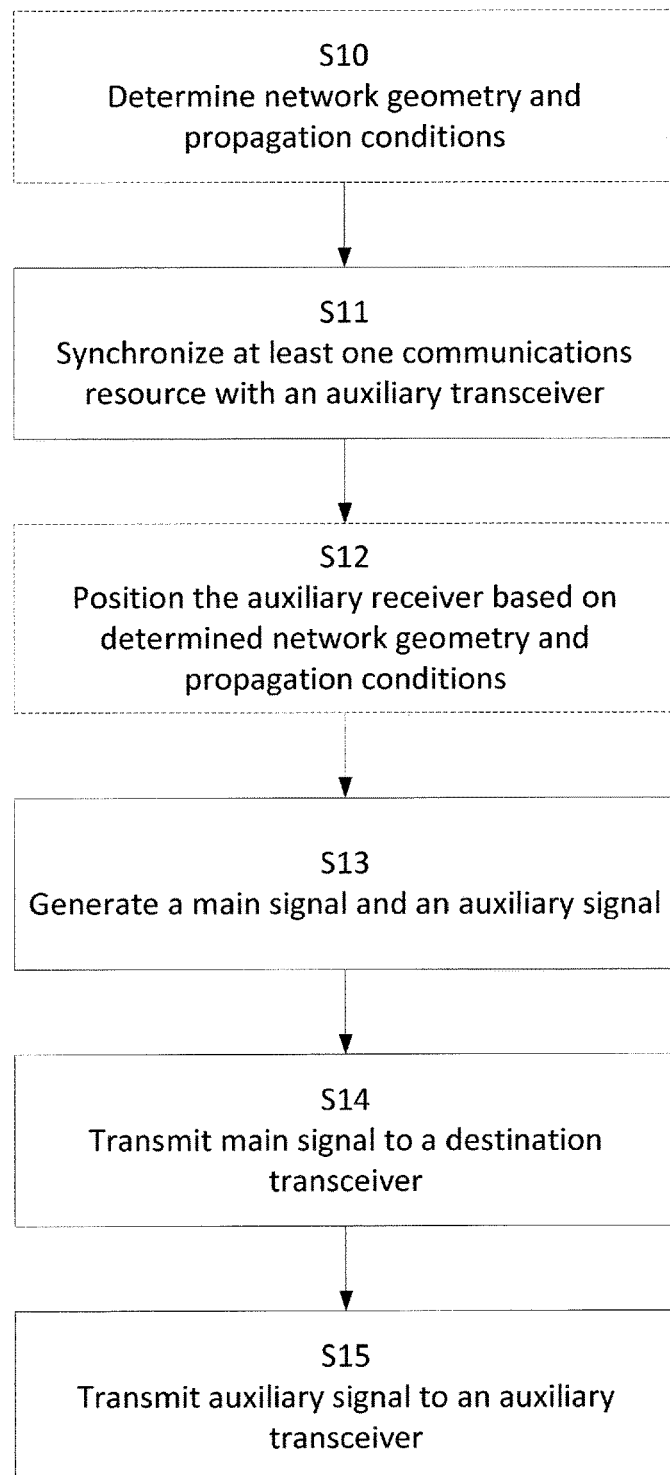
FIGS. 3-5 show flowcharts of various methods of the disclosure.

FIG. 3 shows a flowchart of a method in a main node 210 for communication with a destination node 220 over long distances. The method comprises the step of synchronizing S11 the use of at least one communications resource with an auxiliary node 230, and also the step of generating S13 a main signal 240 and an auxiliary signal 250 from an information quantity. The method further comprises the step of transmitting S14 the main signal 240 to the destination node 220 by the at least one synchronized communications resource, and also transmitting S15 the auxiliary signal 250 to the auxiliary node 230 by the at least one synchronized communications resource.

Thus, by synchronizing the at least one communications resource between a main node and an auxiliary node, and transmitting the information quantity via both main and auxiliary transmit signals to the destination node, network diversity is established. By means of said network diversity and synchronization, efficient and reliable long distance communication is facilitated.

Also, due to said synchronization, the communications link will have long range capability, with no significant added processing delay as would be the case should, e.g., a powerful error correction code have been applied to the communications link between main node and destination node. Another benefit of the above technique is an increased capacity of the communications link, stemming from the improved transmission conditions of the link, in particular at places of poor transmission conditions.

It is noted that re-transmission techniques based on, e.g., automatic repeat request, ARQ, will most likely not be effective in the type of fading conditions discussed herein, due to that the fading is slow as discussed above. Thus, re-transmissions have an equal low probability of successful reception given that a previous attempt of transmission has failed.

According to an aspect, the method further comprises the step of determining S10 a network geometry and a network propagation condition of a network 200 comprising the main node 210, the destination node 220, and the auxiliary node 230.

According to an aspect, the method also comprises the step of positioning S12 the auxiliary node 230 based on said determined network geometry and propagation conditions to optimize transmission conditions for communication between the main node 210 and the destination node 220.

The step of determining S10 together with the step of positioning S12 together brings an additional benefit of the disclosed method: By analyzing current network conditions, i.e., the geometry and other propagation conditions such as weather conditions, a propagation condition forecast can be constructed as a function of node positions and their current and future movement. Thus, propagation conditions can be improved beyond the statistical improvement due to diversity in a network where nodes have random positions to provide a more deterministic improvement due to said determining S10 followed by said positioning S12.

According to an aspect, the propagation condition forecast is constructed by using the current main node, auxiliary node, and destination node positions in relation to each other and to at least one reflector in the environment, to calculate propagation path distances according to the two-path or multi-path channel model. Based on said path distances, i.e., based on direct and reflected path distances, and the frequency of the transmitted signals, propagation attenuation is determined for the different paths by using the two-path channel model. Changes in propagation attenuation for the different paths can then be predicted by taking the relative motion patterns of the nodes into account. Thus, by extrapolating relative motion patterns of the main node, the auxiliary node, and the destination node a propagation forecast can be constructed which shows the current and expected future attenuation on the different propagation paths in the network.

According to an aspect, the determining of a propagation forecast is also based on the relative motion patterns of the main node 210, the auxiliary node 230, and the destination node 220 in relation to the environment, i.e., in relation to at least one reflector in the environment.

Given such a propagation condition forecast, it is then possible to determine a suitable position or suitable track over time of the auxiliary node 230 in relation to the main node 210 and the destination node 220 to achieve deterministic improvements in transmission conditions.

According to an aspect, the method also comprises manoeuvring either or a combination of the nodes of the network to achieve and also maintain optimum or required transmission conditions.

Manoeuvring here comprises navigating, i.e., determining a path from the current location of the auxiliary node to a new location, followed by moving the auxiliary node to the new location.

According to an aspect, the manoeuvring comprises manoeuvring by means of an automatic piloting system said nodes based on the propagation forecast in order to achieve and maintain improved transmission conditions.

According to an embodiment, transmission conditions are not fully optimized, i.e., nodes are deliberatively not manoeuvered to an optimal relative position. Instead transmission conditions are only improved up to a pre-determined level, whereupon the main node 210 and auxiliary node 230 and destination node 220 are free to manoeuver at will. Consequently, as long as transmission conditions from the main node to the destination node fulfils a set of requirements on e.g. error free transmission at a given rate, then no manoeuvring is required from network nodes.

According to an aspect, as soon as, e.g., transmission conditions drop below a pre-determined requirement, then manoeuvring is requested, or demanded, from network nodes.

It should be noted that although transmission from the main node to the destination node is discussed above, similar beneficial effects will be obtained if the communication direction is reversed such that the destination node instead transmits signals to the main node via the auxiliary node. Hence, an aspect of the present disclosure comprises a method in a destination node 220 for communication with a main node 210 over long distances, the method comprising the steps of;

synchronizing the use of at least one communications resource 270 with an auxiliary node 230,
generating a main signal 240 and an auxiliary signal 250 from an information signal,
transmitting the main signal 240 to the main node 210 by the at least one synchronized communications resource 270,
transmitting the auxiliary signal 250 to the auxiliary node 230 by the at least one synchronized communications resource 270.

Figure 4:
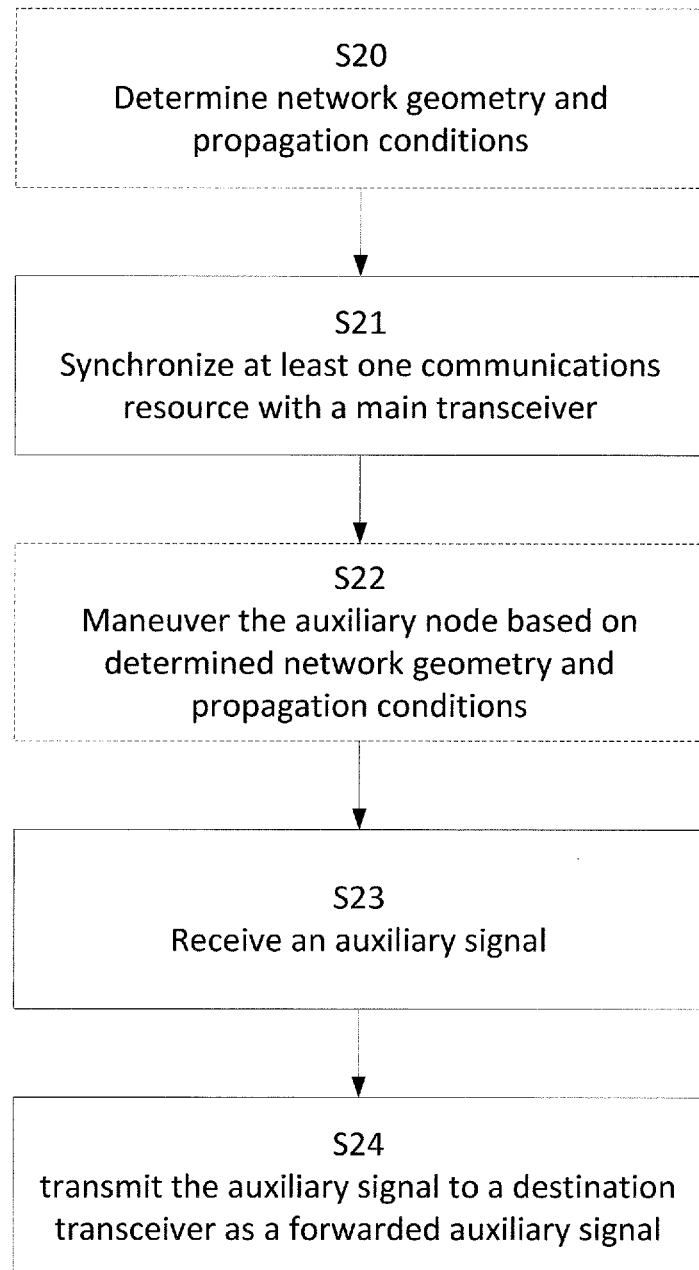

FIG. 4 shows a flowchart of a method in an auxiliary node 230 for communication between a main node 210 and a destination node 220 over long distances. The method comprising the steps of synchronizing S21 the use of at least one communications resource with the main node 210. The method also comprises receiving S23 an auxiliary signal 250 from the main node 210 by the at least one synchronized communications resource, and transmitting S24 a forwarded auxiliary signal 260 to the destination node 220 by the at least one synchronized communications resource.

It should be noted that the forwarded auxiliary signal 260 comprises the information quantity, and possibly also redundant information used for, e.g., error correction.

According to an aspect, the step of transmitting S24 further comprises detecting the information quantity and re-modulating said information quantity to obtain the forwarded auxiliary signal.

According to an aspect, the method further comprises the step of determining S20 a network geometry and a network propagation condition of a network 200 comprising the main node 210, the destination node 220, and the auxiliary node 230.

According to an aspect, the method also comprises the step of changing S22 the position of the auxiliary node 230 based on the determined network geometry and the determined network propagation condition to optimize transmission conditions for communication between the main node 210 and the destination node 220.

Figure 5:
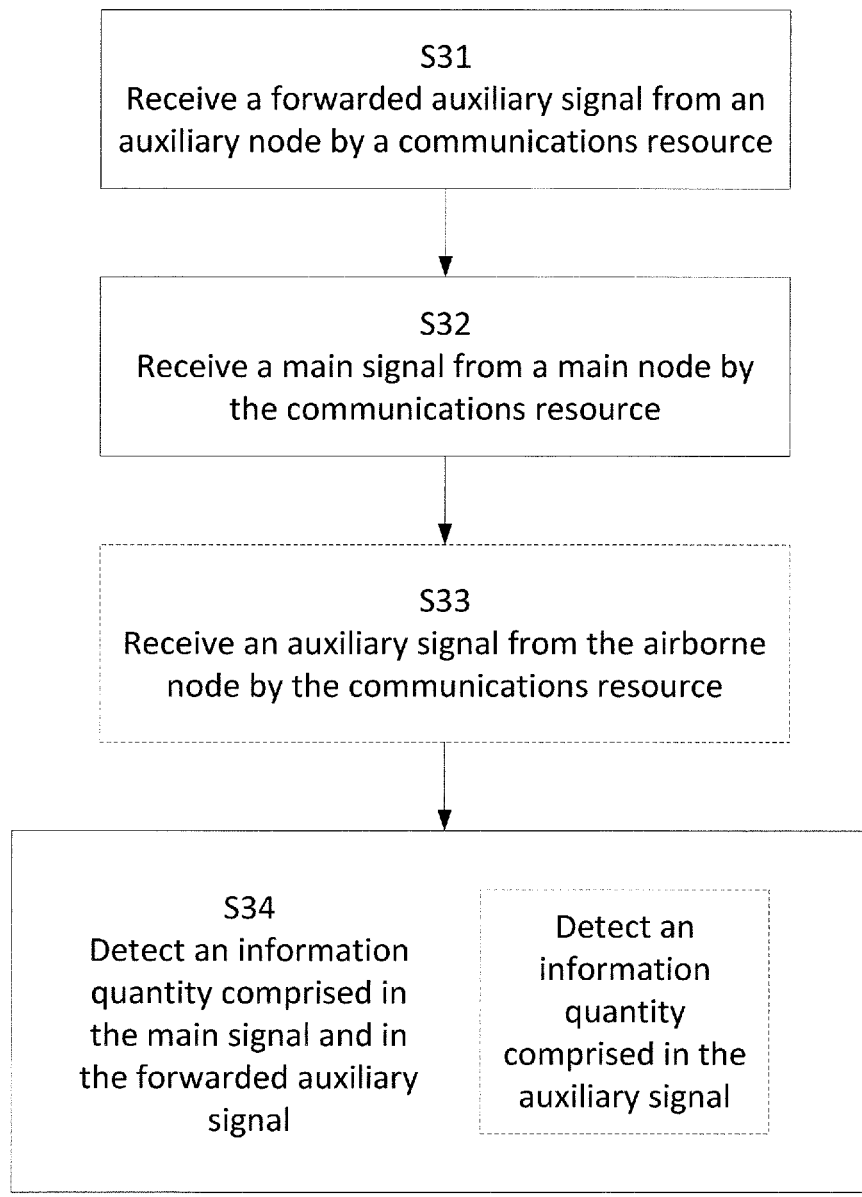

FIG. 5 shows a flowchart of a method in a destination node 220 for communication between a main node 210 and the destination node 220 over long distances, the method comprising the steps of;
receiving S31 a forwarded auxiliary signal 260 from an auxiliary node 230 by a communications resource 270;
receiving S32 a main signal 240 from a main node 210 by a communications resource 270;
detecting S34 an information quantity comprised in the main signal 240 and in the forwarded auxiliary signal 250.

According to an aspect, the method shown in FIG. 5 further comprises the step of receiving S33 an auxiliary signal 250 from the main node 210 by the communications resource, and the step of detecting S34 an information quantity further comprises detecting an information quantity comprised in the auxiliary signal 250.

Figure 6:
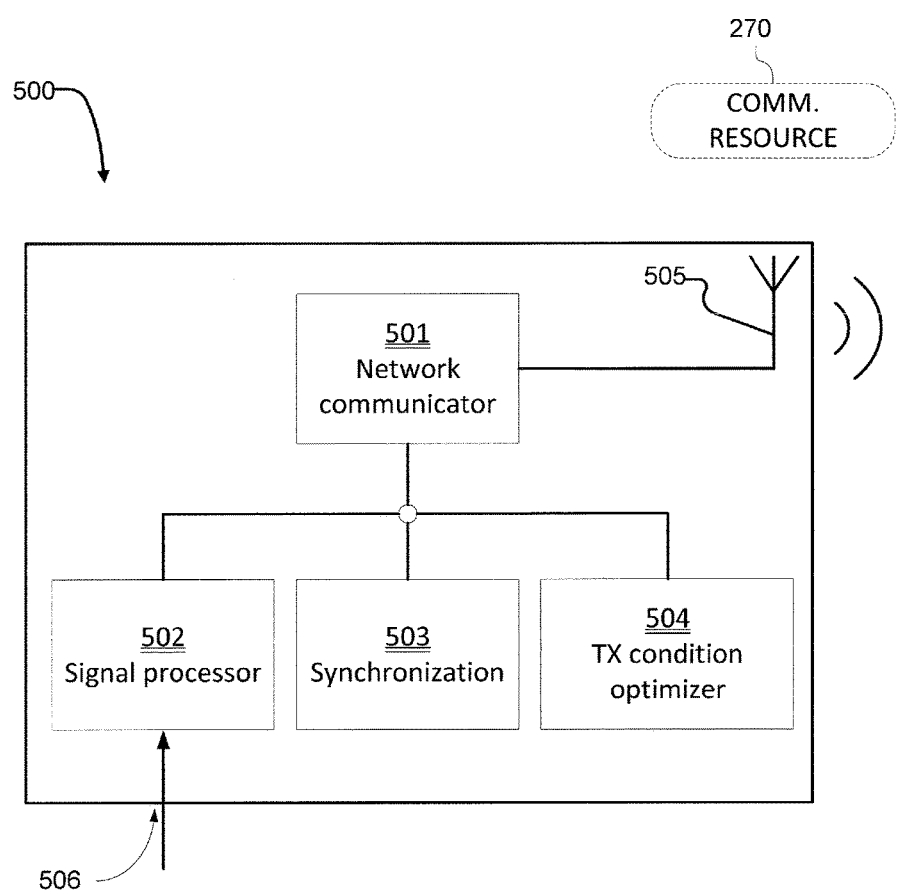
FIGS. 6-7 show schematic block diagrams of network nodes of the disclosure.

FIG. 6 shows a schematic block diagram of a transceiver 500 in a main node arranged for long distance communication. The transceiver 500 comprises a network communicator unit 501 connected to an antenna unit 505, a signal processor unit 502, a synchronization unit 503, and a transmission condition optimizer 504. The synchronization unit 503 is arranged to synchronize the use, by the network communicator 501, of at least one communications resource 270 with an auxiliary node. The signal processor unit 502 is arranged to generate a main signal and an auxiliary signal from an input information quantity arranged to be received on an input interface 506 of the main node. The network communicator unit 501 is arranged to receive the main signal and the auxiliary signal and to transmit said main and auxiliary signals via the antenna unit 505 to a destination node and an auxiliary node, respectively.

The network communicator unit 501 is arranged to exploit the communications resource 270 used by the main node, i.e., either of a transmission time schedule, a transmission frequency allotment schedule, or a spread spectrum spreading code assignment.

Figure 7:
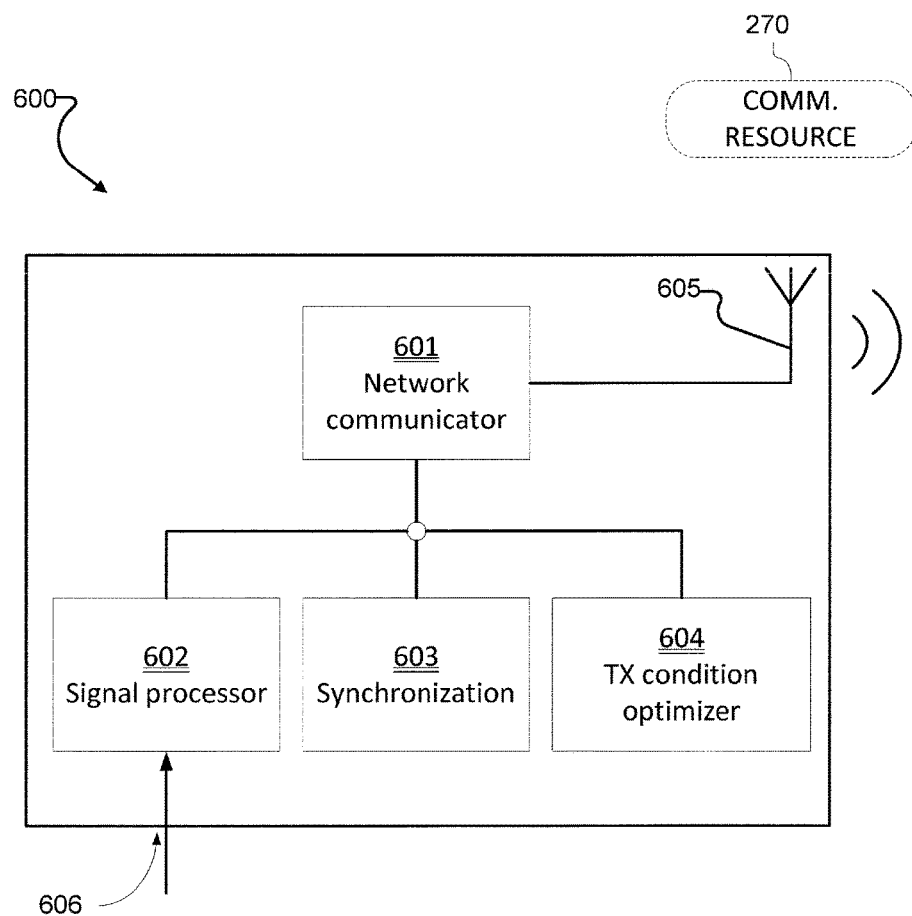

FIG. 7 shows a schematic block diagram of a transceiver 600 arranged to assist in long distance communication in an auxiliary node. The transceiver 600 comprises a network communicator unit 601 connected to an antenna unit 605, a signal processor 602, a synchronization unit 603, and a transmission condition optimizer 604. The synchronization unit 603 is arranged to synchronize the use by the network communicator 601 of at least one communications resource 270 with a main node. The signal processor unit 602 is arranged to receive, by the network communicator unit 601, an auxiliary signal and to retransmit said auxiliary signal as a forwarded auxiliary signal by the network communicator unit 601.

According to an aspect, the network communicator unit 501, 601 of either of the transceivers 500, 600 mentioned above is arranged to apply a forward error correction, FEC, channel code prior to transmitting signals via the antenna unit 505.

According to an aspect, the network communicator unit 501, 601 of either of the transceivers 500, 600 mentioned above is arranged to access a shared transmission medium of the network by means of either of a time division multiple access, TDMA, method, a frequency division multiple access, FDMA, method, a code division multiple access, CDMA, method, or an orthogonal frequency division multiple access, OFDMA, method.

According to an aspect, the network communicator unit 501, 601 of either of the transceivers 500, 600 mentioned above is arranged to simultaneously transmit and receive signals via the antenna unit 505.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method in a main node for communication with a destination node over long distances, the method comprising:
synchronizing use of at least one communications resource with an auxiliary node,
generating a main signal and an auxiliary signal from an information quantity,
transmitting the main signal to the destination node by the at least one synchronized communications resource,
transmitting the auxiliary signal to the auxiliary node by the at least one synchronized communications resource;
determining a network geometry and a network propagation condition of a network comprising the main node, the destination node, and the auxiliary node; and
positioning the auxiliary node based on said determined network geometry and propagation conditions to optimize transmission conditions for communication between the main node and the destination node,
wherein determining a network geometry and a network propagation condition of a network further comprises constructing a propagation condition forecast based on changes in the network geometry and a network propagation condition of the network, and
wherein positioning the auxiliary node comprises optimizing transmission conditions for communication between the main node and the destination node based on said propagation condition forecast.

2. The method according to claim 1, wherein the at least one communications resource comprises at least one out of a transmission time schedule, a transmission frequency allotment schedule, and a spread spectrum spreading code assignment.

3. A method in an auxiliary node for communication between a main node and a destination node over long distances, the method comprising:
synchronizing use of at least one communications resource with the main node,
receiving an auxiliary signal from the main node by the at least one synchronized communications resource,
transmitting a forwarded auxiliary signal to the destination node by the at least one synchronized communications resource,
determining a network geometry and a network propagation condition of a network comprising the main node, the destination node, and the auxiliary node; and
positioning the auxiliary node based on said determined network geometry and propagation conditions to optimize transmission conditions for communication between the main node and the destination node,
wherein determining the network geometry and the network propagation condition of a network further comprises constructing a propagation condition forecast based on changes in the network geometry and the network propagation condition of the network, and
wherein positioning the auxiliary node comprises optimizing transmission conditions for communication between the main node and the destination node based on said propagation condition forecast.

4. The method according to claim 3, further comprising:
manoeuvring the auxiliary node based on the determined network geometry and the determined network propagation condition in order to optimize transmission conditions for communication between the main node and the destination node.

5. A transceiver arranged for long distance communication in a main node, the transceiver comprising:
an antenna unit,
a network communicator unit connected to the antenna unit, a signal processor unit,
a synchronization unit, and
a transmission condition optimizer,
wherein the synchronization unit is arranged to synchronize use by the network communicator of at least one communications resource with an auxiliary node, determining a network geometry and a network propagation condition of a network comprising the main node, the destination node, and the auxiliary node, the auxiliary node is positioned based on said determined network geometry and propagation conditions to optimize transmission conditions for communication between the main node and the destination node, wherein determining the network geometry and the network propagation condition of a network further comprises constructing a propagation condition forecast based on changes in the network geometry and a network propagation condition of the network, and wherein positioning the auxiliary node comprises optimizing transmission conditions for communication between the main node and the destination node based on said propagation condition forecast, wherein the signal processor unit is arranged to generate a main signal and an auxiliary signal from an input information quantity arranged to be received on an input interface of the main node, and wherein the network communicator unit is arranged to receive the main signal and the auxiliary signal and to transmit said main and auxiliary signals via the antenna unit to a destination node and the auxiliary node, respectively.

6. A transceiver arranged to assist in long distance communication in an auxiliary node, the transceiver comprising:
an antenna unit,
a network communicator unit connected to the antenna unit,
a synchronization unit, and
a transmission condition optimizer,
wherein the synchronization unit is arranged to synchronize use by the network communicator of at least one communications resource with a main node, determining a network geometry and a network propagation condition of a network comprising the main node, the destination node, and an auxiliary node, the auxiliary node is positioned based on said determined network geometry and propagation conditions to optimize transmission conditions for communication between the main node and the destination node, wherein determining the network geometry and the network propagation condition of the network further comprises constructing a propagation condition forecast based on changes in the network geometry and a network propagation condition of the network, and wherein positioning the auxiliary node comprises optimizing transmission conditions for communication between the main node and the destination node based on said propagation condition forecast, and wherein the signal processor unit is arranged to be received, by the network communicator unit an auxiliary signal and to retransmit said auxiliary signal as a forwarded auxiliary signal by the network communicator unit.

7. The transceiver according to claim 6, wherein the network communicator unit is arranged to apply a forward error correction, channel code prior to transmitting signals via the antenna unit.

8. The transceiver according to claim 6, wherein the network communicator unit is arranged to access a shared transmission medium by either of a time division multiple access method, a frequency division multiple access method, a code division multiple access method, or an orthogonal frequency division multiple access method.

9. The transceiver according to claim 6, wherein the network communicator unit is arranged to simultaneously transmit and receive signals via the antenna unit.

10. The transceiver according to claim 5, wherein the network communicator unit is arranged to apply a forward error correction channel code prior to transmitting signals via the antenna unit.

11. The transceiver according to claim 5, wherein the network communicator unit is arranged to access a shared transmission medium by either of a time division multiple access method, a frequency division multiple access method, a code division multiple access method, or an orthogonal frequency division multiple access method.

12. The transceiver according to claim 5, wherein the network communicator unit is arranged to simultaneously transmit and receive signals via the antenna unit.

* * * * *